United States Patent [19]

Mitsuyasu

[11] Patent Number: 5,053,668
[45] Date of Patent: Oct. 1, 1991

[54] APPARATUS FOR DRIVING PIEZOELECTRIC ELEMENT FOR CLOSING AND OPENING VALVE MEMBER

[75] Inventor: Masaki Mitsuyasu, Susono, Japan

[73] Assignee: Toyota Jidosha Kabushiki Kaisha, Toyota, Japan

[21] Appl. No.: 461,236

[22] Filed: Jan. 5, 1990

[30] Foreign Application Priority Data

Jan. 18, 1989 [JP] Japan .................. 1-7668

[51] Int. Cl.$^5$ .................. H01L 41/08; F02M 51/06
[52] U.S. Cl. .................. 310/317; 310/316; 310/318; 310/319; 123/494; 123/498
[58] Field of Search .................. 310/316–319; 123/478, 494, 498, 642

[56] References Cited

U.S. PATENT DOCUMENTS

| 4,237,399 | 12/1980 | Sakamoto | 310/317 |
| 4,499,878 | 2/1985 | Igashira et al. | 123/498 |
| 4,520,289 | 5/1985 | Sato et al. | 310/316 |
| 4,644,212 | 2/1987 | Moritugu et al. | 310/317 |
| 4,649,886 | 3/1987 | Igashira et al. | 123/498 |
| 4,688,536 | 8/1987 | Mitsuyasu | 310/317 |
| 4,732,129 | 3/1988 | Takigawa et al. | 310/316 |
| 4,748,954 | 6/1988 | Igashira et al. | 123/498 |
| 4,767,959 | 8/1988 | Sakakibara et al. | 310/317 |
| 4,784,102 | 11/1988 | Igashira et al. | 123/498 |
| 4,887,569 | 12/1989 | Igashira et al. | 123/494 |

FOREIGN PATENT DOCUMENTS

| 2589523 | 5/1987 | France | 123/498 |
| 0271881 | 12/1986 | Japan | 310/316 |
| 0289682 | 12/1986 | Japan | 310/317 |

Primary Examiner—Mark O. Budd
Assistant Examiner—Thomas M. Dougherty
Attorney, Agent, or Firm—Kenyon & Kenyon

[57] ABSTRACT

In an apparatus for driving a piezoelectric element to close and open a valve member by expanding and contracting a volume of a pressure chamber, at an initial stage of a closing state of the valve member, a higher voltage than a conventional charging voltage or a lower voltage than a conventional discharging voltage is applied to the piezoelectric element, to thus create an initial large closing force at the valve member.

17 Claims, 12 Drawing Sheets

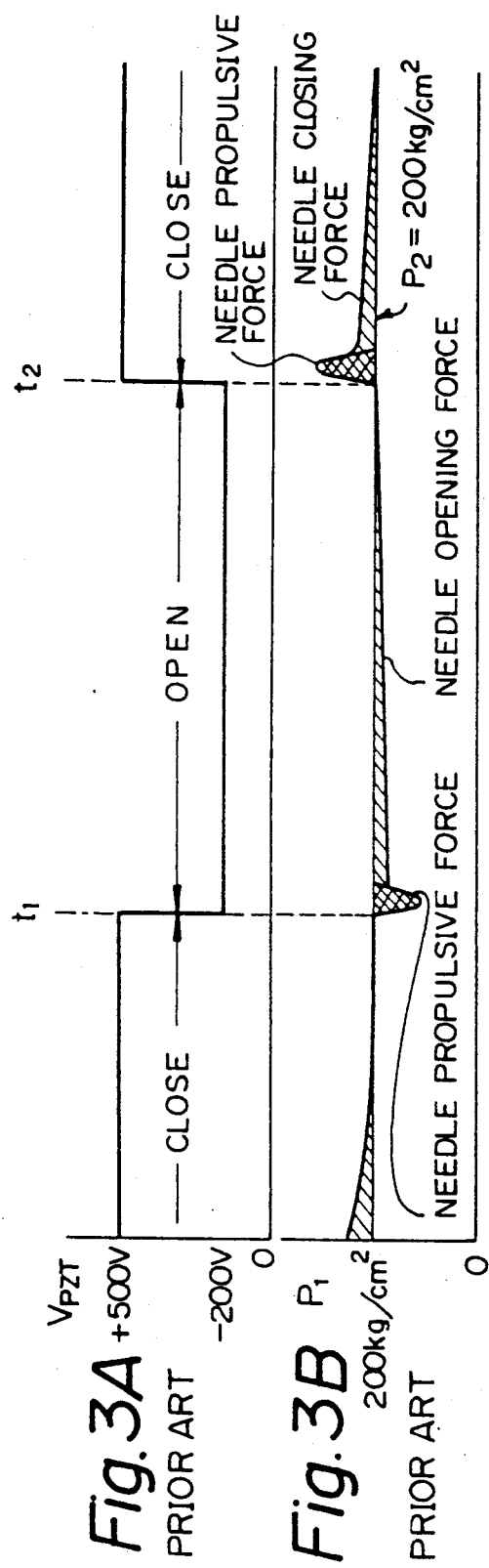

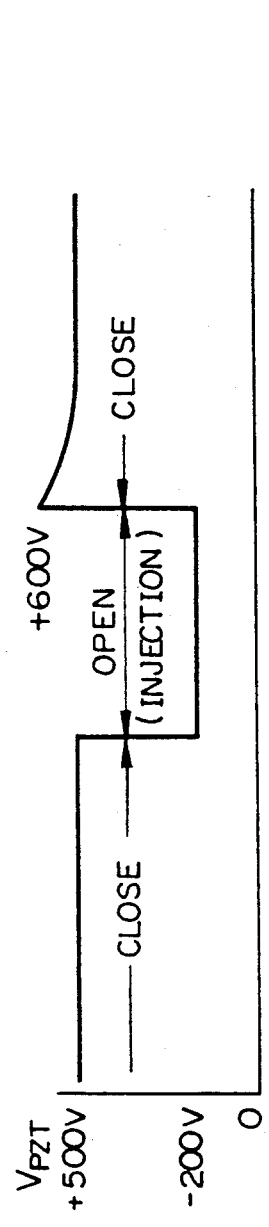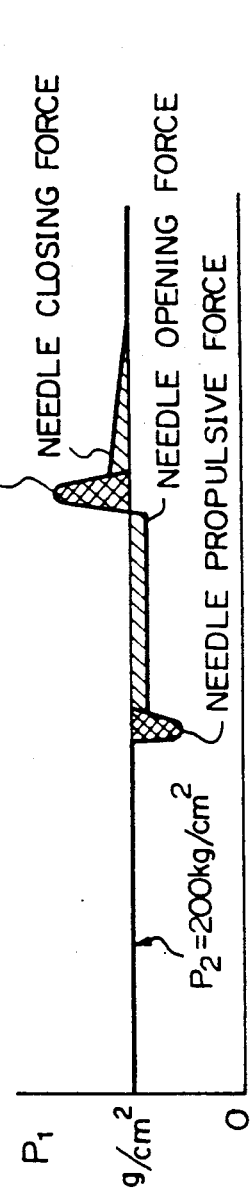

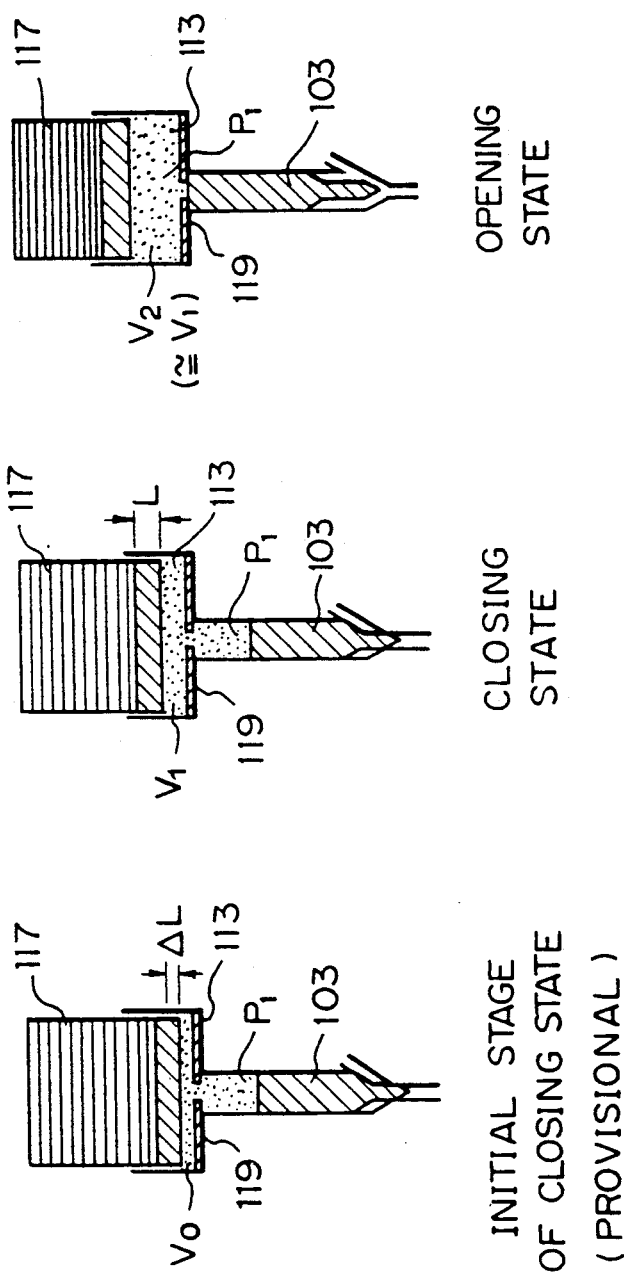

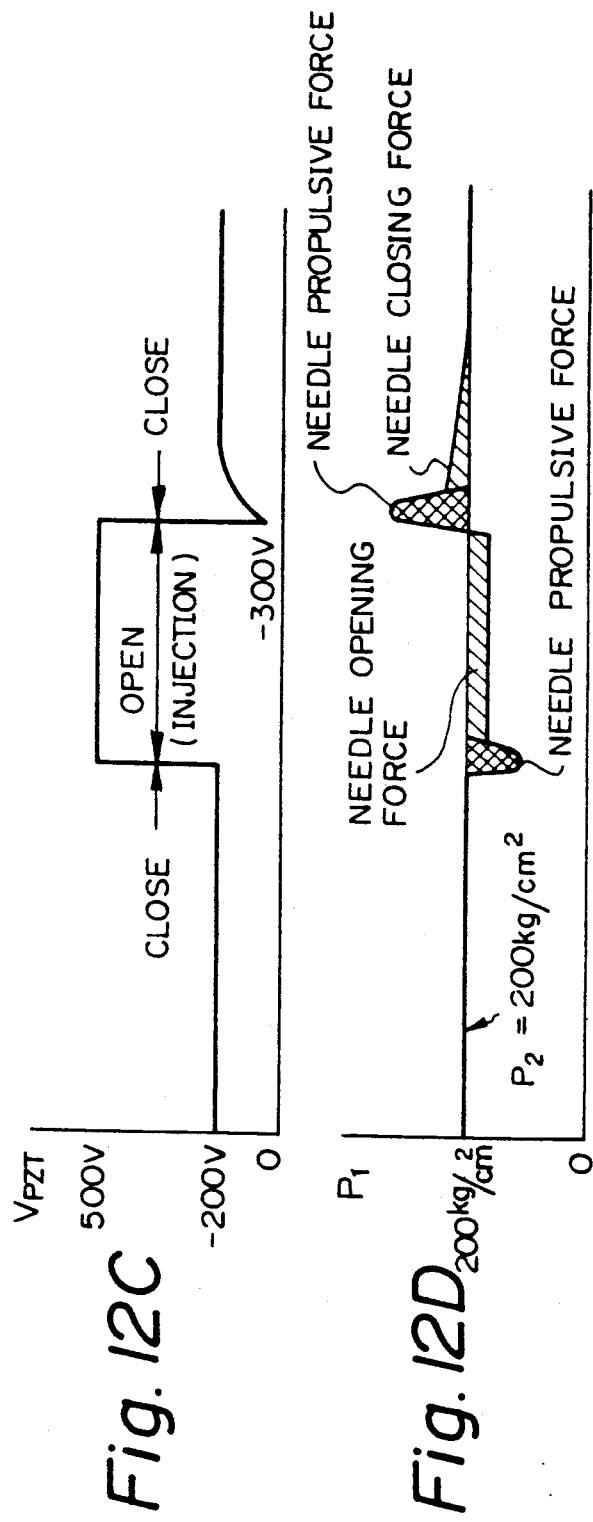

APPARATUS FOR DRIVING PIEZOELECTRIC ELEMENT FOR CLOSING AND OPENING VALVE MEMBER

CROSS-REFERENCE TO RELATED APPLICATION

This application is related to U.S. application Ser. No. 07/443,220 of Naoyuki TSUZUKI, et al. filed on Nov. 29, 1989, entitled APPARATUS FOR DRIVING PIEZOELECTRIC ELEMENT FOR CLOSING AND OPENING VALVE MEMBER.

BACKGROUND OF THE INVENTION

1. Field of the Invention

The present invention relates to an apparatus for driving a piezoelectric element which is used as a fuel injection valve of a gasoline engine, a diesel engine, or the like.

2. Description of the Related Art

A high response characteristic piezoelectric element is applicable to an actuator of a fuel injection apparatus of a gasoline engine, a diesel engine, and the like (see: Unexamined Japanese Patent Publication (Kokai) Nos. 60-249877 and 62-17338). For example, in a fuel injection apparatus, a pressure chamber is linked to a controlled fuel passage, and a needle as a valve member is provided therebetween. Fuel is supplied from the controlled fuel passage, via a clearance of the needle, to the pressure chamber, and further, fuel is leaked from the pressure chamber, via the above-mentioned clearance, to the controlled fuel passage. In this fuel injection apparatus, a piezoelectric element is provided to expand and contract a volume of the pressure chamber, thereby closing and opening the needle. In the prior art, if this piezoelectric element is expanded and contracted by applying a positive voltage and a negative voltage thereto, respectively, a definite positive voltage is applied to the piezoelectric element to expand it, i.e., contract the volume of the pressure chamber, thereby closing the needle, and a definite negative voltage is applied to the piezoelectric element to contract it, i.e., expand the volume of the pressure chamber, thereby opening the needle.

In the above-mentioned prior art method for driving the piezoelectric element, however, if an opening state of the needle is very short, a large closing force cannot be generated at the needle, which may cause a secondary opening, such as a secondary injection, during a closing state, which will be later explained in more detail.

SUMMARY OF THE INVENTION

Therefore, an object of the present invention is to increase a closing force of the needle (valve member) during a closing state even when an opening time is short.

According to the present invention, in an apparatus for driving a piezoelectric element to close and open a valve member by expanding and contracting a volume of a pressure chamber, at an initial stage of a closing state of the valve member a higher voltage than a conventional charging voltage or a lower voltage than a conventional discharging voltage is applied to the piezoelectric element, to thus create an initial large closing force in the valve member.

BRIEF DESCRIPTION OF THE DRAWINGS

The present invention will be more clearly understood from the description as set forth below, with reference to the accompanying drawings, wherein:

FIGS. 3A, 3B, 4A, and 4B are timing diagrams showing the operation of the apparatus of FIG. 1;

FIGS. 8A through 8D are timing diagrams showing the operation of the circuit of FIG. 7;

FIGS. 9A, 9B, and 9C are diagrams showing the states of the fuel injection apparatus of FIG. 1 obtained by the operation of the circuit of FIG. 7;

DESCRIPTION OF THE PREFERRED EMBODIMENTS

Figure 1:
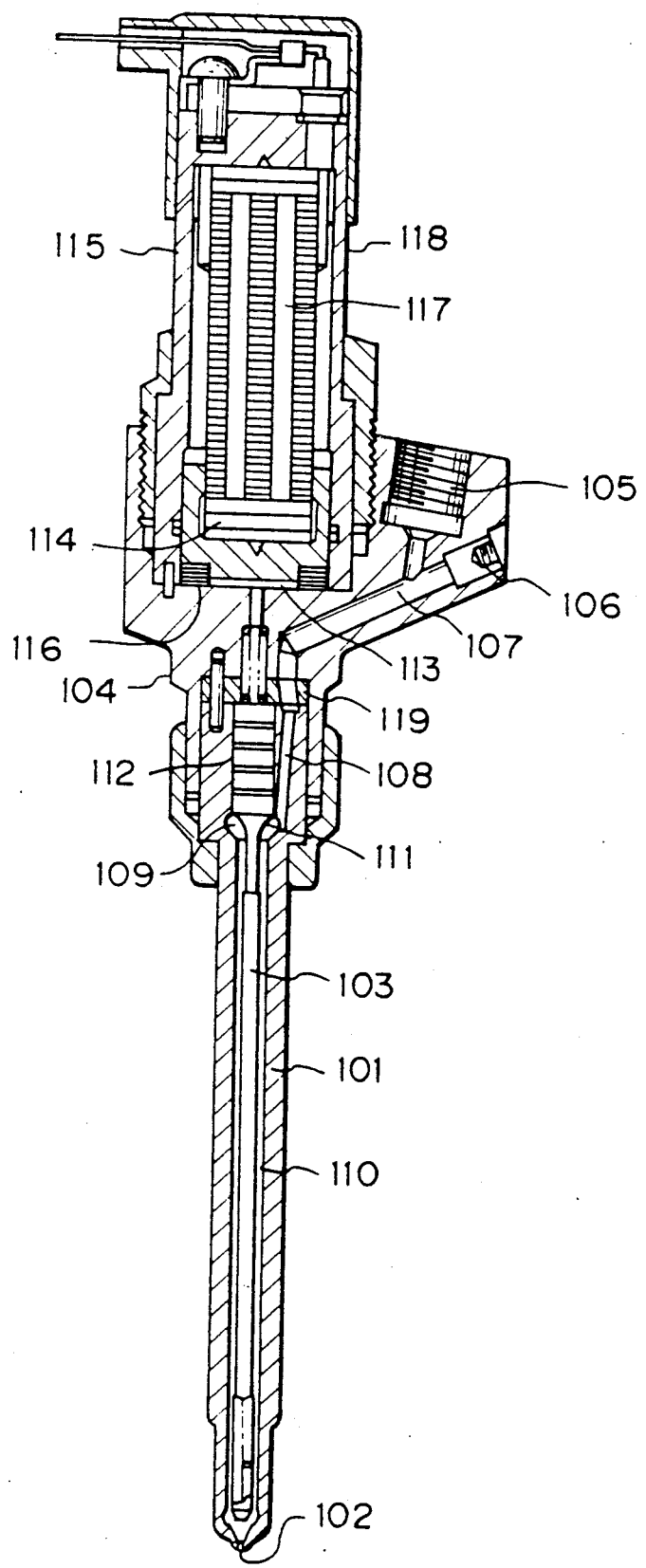
FIG. 1 is a longitudinal cross-sectional view illustrating an example of a fuel injection apparatus where a piezoelectric element is used as an actuator.

First, a fuel injection apparatus according to the present invention, to which an apparatus for driving a piezoelectric element is applied, will be explained with reference to FIG. 1. That is, in FIG. 1, reference 101 indicates a nozzle body having an injection hole 102 in a pointed end thereof, and a needle (valve member) 103 is inserted into the nozzle body 101 to open and close the injection hole 102. The nozzle body 101 is fitted into a body 104, and fuel is supplied from a fuel inlet 105, a fuel passage 107 having a blind plug 106, a fuel passage 108, a fuel accumulating chamber 109, and a pressure accumulating chamber 110, to the injection hole 102. A tapered pressure suscepter 111 is formed in the needle 103, and when a fuel pressure is applied to the pressure suscepter 111, the needle 103 moves in the valve opening direction. The fuel accumulating chamber 109 is formed around the pressure suscepter 111. Formed between the upper portion of the needle 103 and the inner surface of the nozzle body 101 is a small clearance 112 through which fuel is supplied from the fuel accumulating chamber 109 to a pressure chamber 113 formed above the chamber 109. The pressure chamber 113 is located between a lower end of a piston 114 and a upper end of the body 104, and a fuel pressure within the pressure chamber 113 serves as a force for moving the needle 103 up and down. The piston 114 is slidably mounted within a case 115 and is pushed up by a dish spring 116. Provided within the case 115 is an electroexpansive actuator 118 having an extensive/contractive laminated piezoelectric element 117. Also, a distance piece 119 is provided below the pressure chamber 111 to define and hold an opening position of the needle 103.

For this purpose, a smaller opening than the perpendicular direction area of the pressure susceptor face 111 is provided in the distance piece 119.

In the fuel injection apparatus of FIG. 1, fuel is supplied, via the fuel inlet 105 and the fuel passages 107 and 108, to the fuel accumulating chamber 109, and is further supplied, via the clearance 112, to the pressure chamber 113 and the pressure accumulating chamber 110 on the side of the injection hole 102.

Figure 2A:
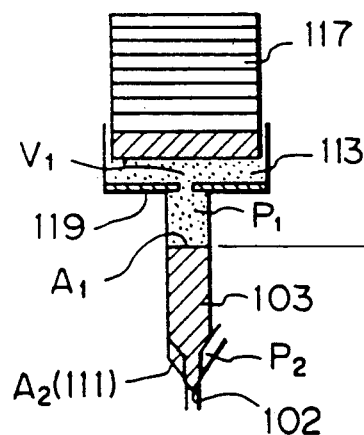
FIGS. 2A and 2B are diagrams schematically showing the operation of the apparatus of FIG. 1.

A closing state and an opening state of the fuel injection apparatus of FIG. 1 will be explained with reference to FIGS. 2A and 2B. Namely, when the piezoelectric element 117 is expanded, the pressure $P_1$ of the pressure chamber 113 is rapidly increased to force the needle 103 down, and as a result, the pressure $P_1$ of the pressure chamber 113 is reduced. As shown in FIG. 2A, in a closing state wherein the needle 103 closes the injection hole 102, a downward force received by the needle 103 is expressed as, $$P_1 \times A_1$$

where $A_1$ is an upper area of the needle 103, and an upward force received by the needle 103 is expressed as, $$P_2 \times A_2$$

where $P_2$ is a predetermined pressure of fuel, such as 200 kg/cm$^2$, at the fuel inlet 105 from the fuel supply passage (not shown), and $A_2$ is an effective longitudinal area of the pressure susceptor 111. Therefore, since $A_1 > A_2$, then $$P_1 \times A_1 > P_2 \times A_2,$$

even when $P_1 = P_2$, whereby a closing state of the needle 103 is maintained. On the other hand, when the piezoelectric element 117 is contracted, the pressure $P_1$ of the pressure chamber 113 is rapidly reduced to allow the needle 103 to move upward, and accordingly, the pressure $P_1$ of the pressure chamber 113 is increased. As shown in FIG. 2B, in a opening state of the needle 103, a downward force received by the needle 103 is expressed as, $$P_2 \times A_1'$$

where $A_1'$ is an area of an opening of the distance piece 119, and an upward force received by the needle 103 is expressed as, $$P_1 \times A_2'$$

where $A_2'$ is an lower effective longitudinal area of the needle 103 including the pressure susceptor 111, i.e., the upper effective area $A_1$, of the needle 103. Therefore, since $A_1 < A_2 (=A_1)$, $$P_1 \times A_1' > P_2 \times A_2'$$

even when $P_1 = P_2$, and thus an opening state of the needle 103 is maintained.

Accordingly, when the piezoelectric element 117 is contracted, the needle 103 is forced upward by the fuel pressure received by the pressure susceptor 111, whereby the needle 103 allows an injection of fuel from the injection hole 102. Conversely, when the piezoelectric element 117 is expanded, the pressure of the pressure chamber 113 is increased to force the needle 103 down, so that the needle 103 is closed to complete the injection.

Although the expansional contraction of the piezoelectric element 117 contributes to the descent/ascent of the needle 103, a closing force of the needle 103 is dependent upon the leakage amount from the pressure chamber 113 due to the expansion of the piezoelectric element 117, and an opening force of the needle 103 is dependent upon the fuel inflow amount to the pressure chamber 113 due to the contraction of the piezoelectric element 117. To carry out this leakage and inflow of fuel, flow, the volume $V_1$ of the pressure chamber 113, including a space of an upper portion of the needle 103 of FIG. 2A and the volume $V_2$ of the pressure chamber 113 of FIG. 2B satisfy:

$$V_1 < V_2.$$

For this purpose, the change of the volume of the pressure chamber 113 due to the expansion/contraction of the piezoelectric element 117 is made larger than that due to the, ascent/descent of the needle 103.

In the prior art, to drive the fuel injection apparatus of FIG. 1, a voltage $V_{PZT}$ as shown in FIGS. 3A, 3B, 4A, 4B is applied to the piezoelectric element 117. Here it is assumed that the piezoelectric element 117 is expanded by applying a positive voltage thereto, and that the piezoelectric element 117 is contracted by applying a negative voltage thereto.

The point at which a closing time and an opening time are both sufficiently long is illustrated in FIG. 3A and 3B. Namely, when the voltage $V_{PET}$ applied to the piezoelectric element 117 is +500 V, the piezoelectric element 117 is expanded as shown in FIG. 3A, so that the needle 103 is in a closing state. In this case, fuel in the pressure chamber 113 is leaked via the clearance 112 of the needle 103, and finally, at a time $t_1$, the pressure $P_1$ of the pressure chamber 113 becomes equal to the pressure $P_2$ (200 kg/cm$^2$) of the fuel accumulating chamber 109. At this time, the volume of the pressure chamber 113 is $V_1$, as indicated in FIG. 2A. Next, at a time $t_1$, when the voltage $V_{PZT}$ applied to the piezoelectric element 117 is changed from +500 V to −200 V, the piezoelectric element 117 is contracted so that the pressure $P_1$ of the pressure chamber 113 is rapidly decreased. As a result, $P_1 > P_2$, and this difference $P_2 - P_1$ contributes to a propulsive force of the needle 103. Therefore, the needle 103 moves upward as shown in FIG. 2B. At this time, the pressure $P_1$ in the pressure chamber 113 rapidly approaches the rail pressure $P_2$, but the upper position of the needle 103 is confined by the distance piece 119 so that $P_1$ is maintained immediately before the rail pressure $P_2$. At this time, the volume of the pressure chamber 113 is still almost $V_1$. Thereafter, fuel is allowed to flow via the clearance 112 to the pressure chamber 113, so that $P_1$ gradually approaches the rail pressure $P_2$, and accordingly, the volume of the pressure chamber 113 is gradually changed from $V_1$ to $V_2$. Finally, at a time $t_2$, $P_1 = P_2$, and the volume of the pressure chamber 113 is $V_2$. Namely, while fuel is supplied to the pressure chamber 113 and the volume thereof is changed from $V_1$ to $V_2$, the pressure $P_1$ of the pressure chamber 113 is smaller than the rail pressure P, thus creating a large opening force at the needle 103.

Next, at a time $t_2$, when the voltage $V_{PZT}$ applied to the piezoelectric element 117 is changed from −200 V to +500 V, the piezoelectric element 117 is expanded so that the pressure $P_1$ of the pressure chamber 113 is rapidly increased. As a result $P_1 > P_2$, and this difference: $P_1 - P_2$ contributes to a propulsive force at the needle 103. Therefore, the needle 103 is moved down as shown in FIG. 2B. At this time, the pressure $P_1$ of the pressure chamber 113 rapidly approaches the rail pressure $P_2$, but the lower position of the needle 103 is confined by the injection hole 102 so that $P_1$ is maintained immediately before the rail pressure $P_2$. At this time, the volume of the pressure chamber 113 is still almost $V_2$. Thereafter, fuel is allowed to flow via the clearance 112 from the pressure chamber 113, so that $P_1$ gradually approaches the rail pressure $P_2$, and accordingly, the volume of the pressure chamber 113 is gradually changed from $V_2$ to $V_1$. Finally, $P_1 = P_2$, and the volume of the pressure chamber 113 is $V_1$. Namely, while fuel is leaked and the volume is changed from $V_2$ to $V_1$, the pressure $P_1$ in the pressure chamber 113 is larger than the rail pressure $P_2$ thus creating a large closing force at the needle 103.

Therefore, when a closing time and an opening time are both sufficiently large, the inflow of fuel to the pressure chamber 113 and the leakage of fuel from the pressure chamber 113 are as required, thus obtaining a large needle, closing force and a large needle opening force.

Figures 4A, 4B:
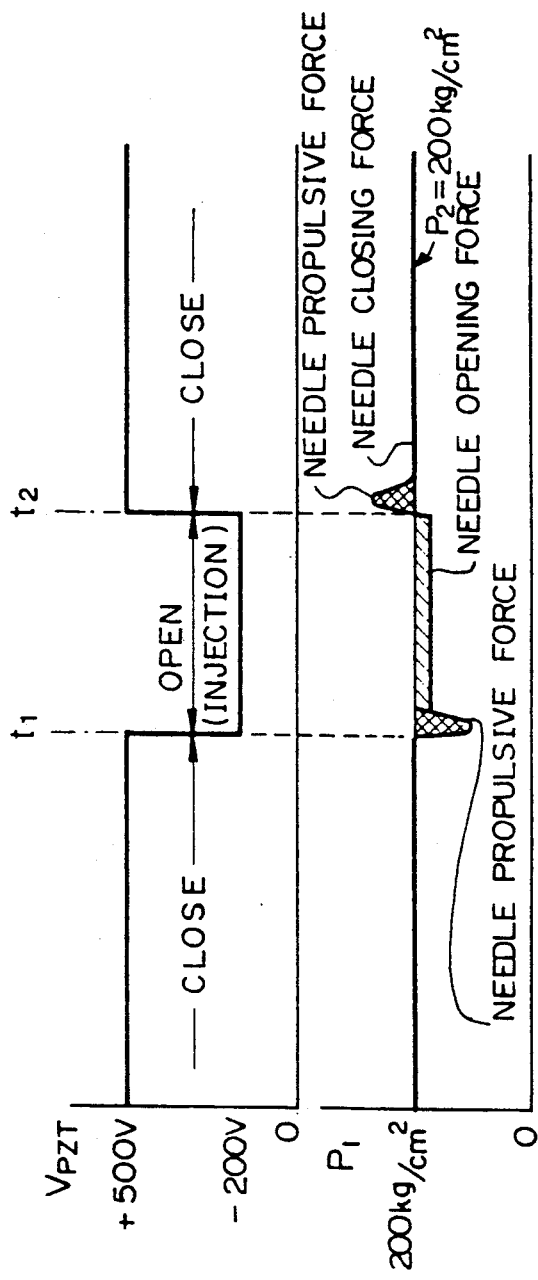

In a fuel injection, however, an opening time (injection time) is much smaller than a closing time, and in this case, the driving state is as illustrated in FIGS. 4A and 4B. Namely, during a long closing time, fuel at the pressure chamber 113 is completely leaked via the clearance 112 of the needle 103, and at an end timing $t_1$ of this closing time $P_1 = P_2$. Contrary to this, during a short opening time, a predetermined rail pressure $P_2$ is always operated at the fuel inlet 105, and the inflow of fuel via the clearance 112 to the pressure chamber 113 is not sufficient. Therefore, even at an end timing $t_2$ of an opening time, $P_1$ (chamber) $< P_2$. In an extreme case, the volume of the pressure chamber 113 is close to $V_1$. Therefore, at a time $t_2$, when the applied voltage $V_{PZT}$ is changed from $-200$ V to $+500$ V, a propulsive force is generated at the needle 103, but since the volume of the pressure chamber 113 immediately after the needle 103 moves down is almost $V_1$, the $P_1$ of the pressure chamber 113 immediately after the descent of the needle 103 is almost $P_2$. Namely, even when a large voltage is applied to the piezoelectric element 117 to close the needle 103, the fuel inflow amount is small during a short opening time. Therefore, after the needle 103 is closed, the leakage of fuel is almost zero, and thus the $P_1$ of the pressure chamber 113 is returned immediately to rail pressure $P_2$.

Therefore, when a piezoelectric element is applied to a fuel injection apparatus having a short opening time, a large needle closing force can not be obtained, and accordingly, the needle 117 is forced upward due to a pressure wave by a water pulsive operation after the closing of the needle 103, thereby inviting a secondary injection.

Figure 5:
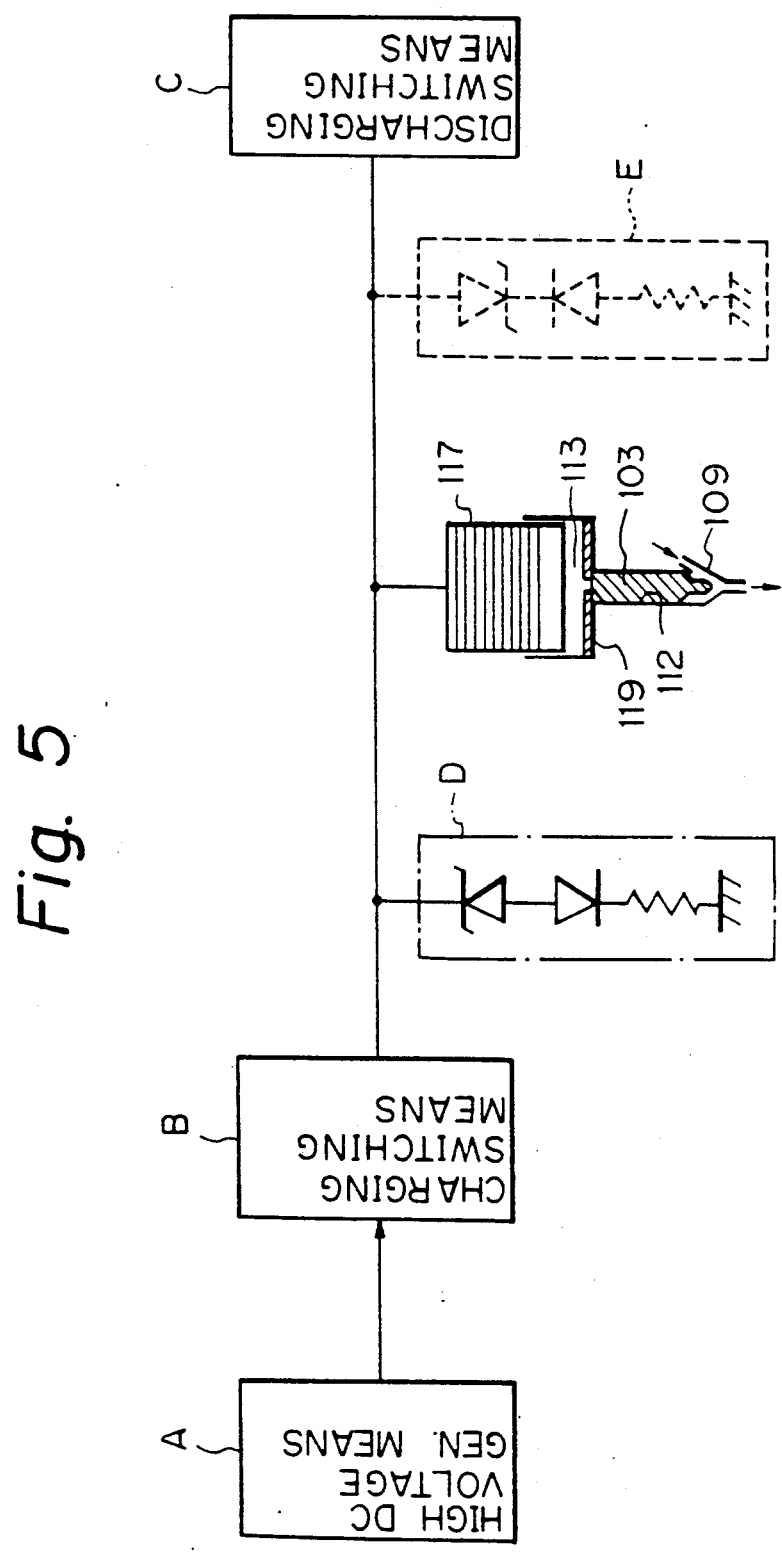
FIG. 5 is a circuit diagram schematically illustrating a basic configuration of an apparatus for driving an piezoelectric element according to the present invention.

In FIG. 5, which illustrates a basic configuration for driving the piezoelectric element according to the present invention, a charging switching means B receives a DC output of a high DC voltage generating means A, to apply a high DC voltage to the piezoelectric element 117, and a discharging switching means C discharges the piezoelectric element 117. In FIG. 5, a voltage gradually-decreasing means D or a voltage gradually-increasing means E is provided. If the piezoelectric element 117 is charged, so that a closing force is generated at the needle 103, the voltage gradually-decreasing means D is provided. In this case, the charging switching means B charges the piezoelectric element 117 by a high voltage of the high voltage generating means A to apply a predetermined voltage such as 600 V to the piezoelectric-element 117. The voltage gradually-decreasing means D applies the initial voltage 600 V to the piezoelectric element 117, and thereafter, gradually decreases this voltage from 600 V to a predetermined voltage such as 500 V.

The discharging switching means C discharges charges of the piezoelectric element 117.

Next, if the piezoelectric element 117 is discharged, so that a closing force is generated at the needle 103, the voltage gradually-increasing means E is provided. That is, the discharging switching means C discharges charges of piezoelectric element to make a voltage of the piezoelectric element 117 a first predetermined voltage such as $-300$ V. The voltage gradually-increasing means E applies the initial voltage $-300$ V to the piezoelectric element 117, and thereafter, gradually increases this voltage from $-300$ V to a predetermined voltage such as $-200$ V.

Figure 6A:
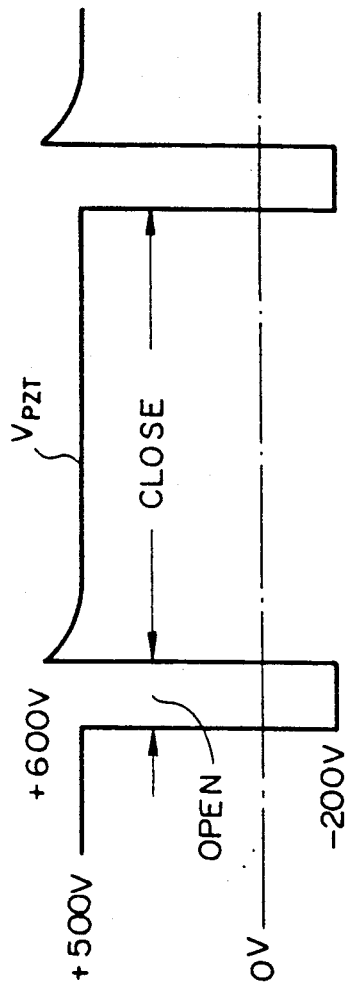
FIGS. 6A and 6B are timing diagrams showing the operation of the circuit of FIG. 5.
Figure 6B:
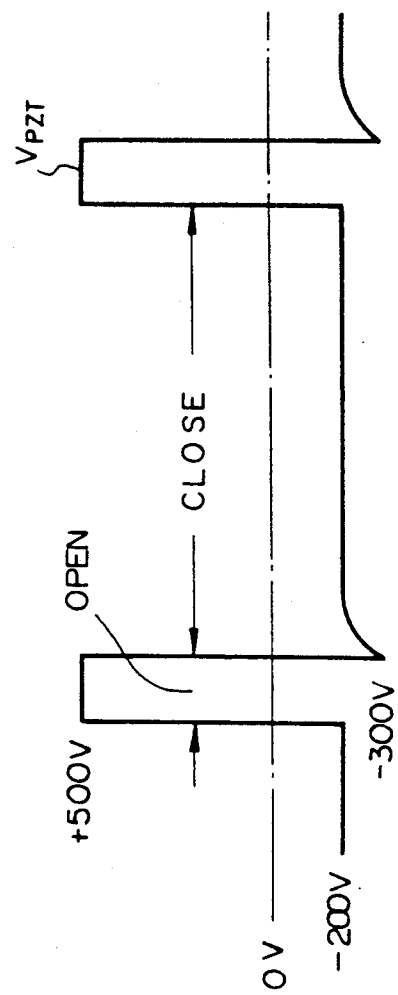

The operation of the apparatus of FIG. 5 provided with the voltage gradually-decreasing means D is shown in FIG. 6A, and the operation of the apparatus of FIG. 5 provided with the voltage gradually-increasing means E is shown in FIG. 6B.

In both cases, an opening time is very short.

At an end timing of a closing time, as shown in FIG. 6A, it is assumed that the piezoelectric element 117 has an expansion corresponding to 500 V, and the volume of the pressure chamber 113 is $V_1$ as indicated in FIG. 9(A). An opening valve time is short, and therefore, the inlet of fuel is almost zero. At an end time of the opening time, even when 500 V is applied to the piezoelectric element 117, the volume of the pressure chamber 113 is almost $V_1$, and $P_1$ (chamber) is almost the rail pressure $P_2$, but as illustrated in FIG. 6A, a higher charging voltage $+600$ V is applied to the piezoelectric element 117 at an initial stage of the closing time, so that the amount of expansion of the piezoelectric element 117 in the closing direction of the needle 103 is larger than the amount of contraction of the piezoelectric element 117 in the opening direction of the needle 103. As a result, a larger closing force is generated at the needle 103. [A secondary opening occurs simultaneously when the needle 103 is closed, and such a larger closing force becomes unnecessary after the closing of the needle 103.] Therefore, the applied voltage $V_{PZT}$ is gradually changed from $+600$ V to $+500$ V. During a relatively long closing time, the needle 103 remains in a closing state, due to the construction thereof, even when $P_1 = P_2$.

Similarly, in FIG. 6B, a larger discharging voltage $-300$ V is applied to the piezoelectric element 117 at an initial stage of the closing time, so that the amount of expansion of the piezoelectric element 117 in the closing direction of the needle 103 is larger than the amount of contraction of the piezoelectric element 117 in the opening direction of the needle 103. As a result, a larger closing force is generated at the needle 103.

Figure 7:
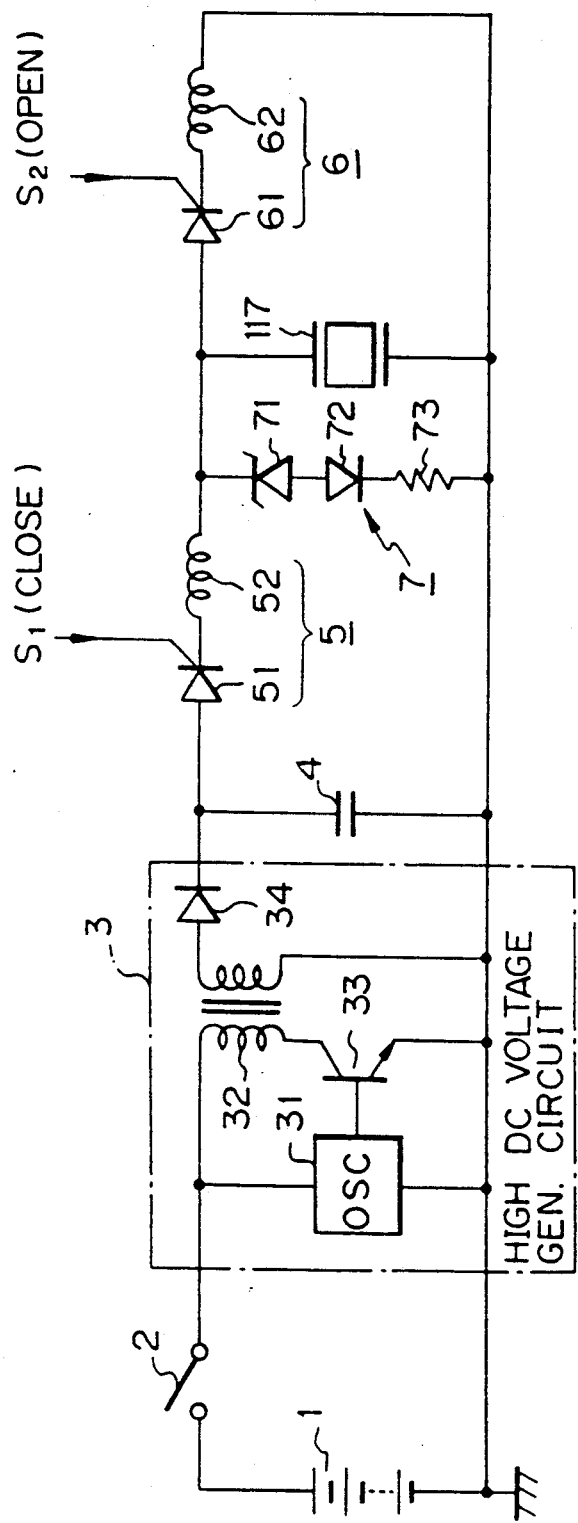
FIG. 7 is a circuit diagram illustrating a first embodiment of the apparatus for driving a piezoelectric element according to the present invention.

At an initial stage of a closing time, even when a larger voltage ($+600$ V) or a smaller voltage ($-300$ V) is applied to the piezoelectric element 117, there is little leakage of fuel from the pressure chamber 113. For this purpose, when the above-mentioned voltage $+600$ or −300 is returned immediately to +500 or −200 V, $P_1$ of the pressure chamber 113 becomes lower than the rail pressure $P_2$, to make it difficult to maintain a closing state per se. For this purpose, a gradual change of the voltage is carried out by the voltage gradually-decreasing means D or the voltage gradually-increasing means E. In FIG. 7, which illustrates a first embodiment of the driving apparatus of a piezoelectric element according to the present invention, it is assumed that, when the piezoelectric element 117 is charged, the element 117 is expanded to carry out a closing operation. Reference 1 designates a 12 V battery which supplies power via an ignition switch 2 to a high DC voltage generating circuit 3. This high DC voltage generating circuit 3 converts the battery voltage 12 V into a voltage of 300 V or the like, and applies it to a condenser 4.

The high DC voltage generating circuit 3 is formed by a high frequency oscillation circuit 31, a step-up transformer 32 as a step-up circuit, a transistor 33 for turning ON and OFF the primary coil of the step-up transformer 32, and a diode 34 for supplying a positive voltage generated in the secondary coil of the step-up transformer 3a to a condenser 4.

Also, a thyristor 51 and a coil 52 are provided as a charging switching circuit 5, and a thyristor 61 and a coil 62 are provided as a discharging circuit 6. The thyristor 51 is turned ON by a closing ignition signal (pulse) $S_1$, and the thyristor 61 is turned ON by an opening ignition signal (pulse) $S_2$.

The coil 52 is used for forming an LC oscillation circuit. Therefore, when the thyristor 51 is turned ON, an LC oscillation circuit is formed by the condenser 4, the coil 52, and the piezoelectric element 117, thereby enhancing the reduction of the voltage of the condenser 4 and the increase of the voltage of the piezoelectric element 117. Thereafter, the thyristor 51 is turned OFF by natural commutation. As a result, the charged voltage of the piezoelectric element 117 is higher than the voltage 300 V of the condenser 4; for example, is 600 V.

The coil 62 is also used for forming an LC oscillation circuit. Therefore, when the thyristor 61 is turned ON, an LC oscillation circuit is formed by the coil 62 and the piezoelectric element 5, thereby enhancing the reduction of the voltage of the piezoelectric element 117. Thereafter, the thyristor 61 is turned OFF by natural commutation. As a result, the discharged voltage of the piezoelectric element 117 becomes lower than the earth voltage (0 V), for example, is −200 V.

Reference 7 designates a voltage gradually-decreasing circuit which includes a Zener diode 71, a reverse current avoiding diode 72, and a resistor 73 for delaying a current flowing through the Zener diode 71.

The operation of the circuit of FIG. 7 will be explained with reference to FIGS. 8A through 8D, and FIGS. 9A, 9B, and 9C.

In the high DC frequency generating circuit 3, the transistor 33 is turned ON and OFF by the pulse signal of the high frequency oscillation circuit 31, a primary current flows through the primary coil of the step-up transformer 32 when the transistor 33 is turned ON, and accordingly, magnetic flux energy is accumulated in the core of the transformer. Next when the transistor 33 is changed from an ON state to an OFF state, the above-mentioned accumulated magnetic flux energy appears as a generated voltage, such as 300 V, in the secondary coil of the step-up transformer 32 in accordance with Faraday's law. When the pulse duration of the pulse signal of the high frequency oscillation circuit 31 is definite, this generated voltage is definite. This generated voltage is accumulated via the diode 34 in the condenser 4, and after a certain time has passed, the voltage of the condenser 4 becomes equal to the generated voltage 300 V of the secondary coil of the step-up transformer 32. At this time, the amount Q of charges accumulated at the condenser 4 (capacitance C) is $$Q = C \times 300 \ V.$$

At this time, or at a subsequent predetermined timing, the CPU (not shown) generates a closing signal $S_1$ and the thyristor 51 is turned ON, whereby an LC oscillation circuit is formed by the condenser 4, the coil 52, and the piezoelectric element 117. Therefore, charges accumulated in the condenser 4 are moved to the piezoelectric element 117, to charge same. In this case, due to the presence of the above-mentioned LC oscillation circuit, the terminal voltage $V_{PZT}$ of the piezoelectric element 117 becomes higher than the final voltage of the condenser 4, as shown in FIG. 8C and becomes, for example, 600 V, and thereafter the thyristor 51 is turned ON by natural commutation.

When the terminal voltage $V_{PZT}$ of the piezoelectric element 117 is 600 V so that fuel is completely leaked, the state of the fuel injection apparatus of FIG. 1 is illustrated in FIG. 9A, and the volume $V_0$ of the pressure chamber 113 is smaller than the volume $V_1$ of FIG. 2A. Namely, if there is no leakage of fuel during an opening time, the volume $V_1$ of the pressure chamber 113 in a closing state of FIG. 9B is about the same as the volume $V_2$ of the pressure chamber 113 in an opening state of FIG. 9C, i.e., $$V_1 \approx V_2$$

Therefore, at a closing initial stage, the volume of the pressure chamber 113 is about the same as the volume $V_1$ at an end timing of an closing stage, but the volume V will become equal to $V_1$, thus creating a large closing force. That is, the difference between the applied voltage +500 V at an end timing of a closing state and the applied voltage +600 V at an initial stage of an closing state, generates a large closing force at the needle 103.

As explained above, charges accumulated in the piezoelectric element 117 are gradually discharged by the voltage gradually-decreasing circuit 7. Namely, the terminal voltage $V_{PZT}$ of the piezoelectric element 117 is gradually reduced from +600 V to +500 V, depending upon a time constant determined by the circuit 7 and the piezoelectric element 117, and thereafter, this voltage becomes stable. Therefore, when the terminal voltage $V_{PZT}$ is +500 V, $P_1 = P_2$. Also, since the volume V of the pressure chamber 113 is almost $V_1$, a subsequent application of +600 V can again generate a large closing force.

When the terminal voltage $V_{PZT}$ of the piezoelectric element 117 becomes 500 V, the fuel injection apparatus of FIG. 1 becomes in a state as shown in FIG. 9B (FIG. 2A), i.e., $P_1 = P_2$, but the closing force of the needle 103 is maintained as explained above.

In the above-mentioned state, after a predetermined time has passed, when the CPU generates opening ignition signal $S_2$, the thyristor 61 is turned ON, so that an LC oscillation circuit is formed by the piezoelectric element 117 and the coil 62, and thus charges accumulated in the piezoelectric element 117 are discharged. In this case, due to the presence of the above-mentioned LC oscillation circuit, the terminal voltage $V_{PZT}$ of the piezoelectric element 117 becomes lower than 0 V, for example, becomes −200 V, and thereafter the thyristor 61 is turned ON by natural commutation.

Figure 2B:
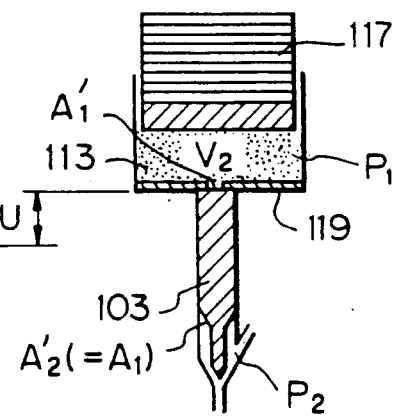

As a result, the injection apparatus of FIG. 1 becomes in a state as shown in FIG. 9C (which is the same, as FIG. 2B).

Namely, the displacement of the piezoelectric element 117 is L at a final stage of a closing state, compared with an opening state, and at an initial stage of a closing state, this displacement will become L+ΔL, which increases the closing force at the needle 103.

Thus, by the circuit of FIG. 7, since the volume of the pressure chamber 117 will be increased at an initial stage of a charging state, the closing force at the needle 103 is increased. Note that only the voltage gradually-decreasing circuit 7 is added, and the signals $S_1$ and $S_2$ for controlling the circuit of FIG. 7 are generated in the same manner as in the prior art driving apparatus not provided with the circuit 7.

Figure 10:
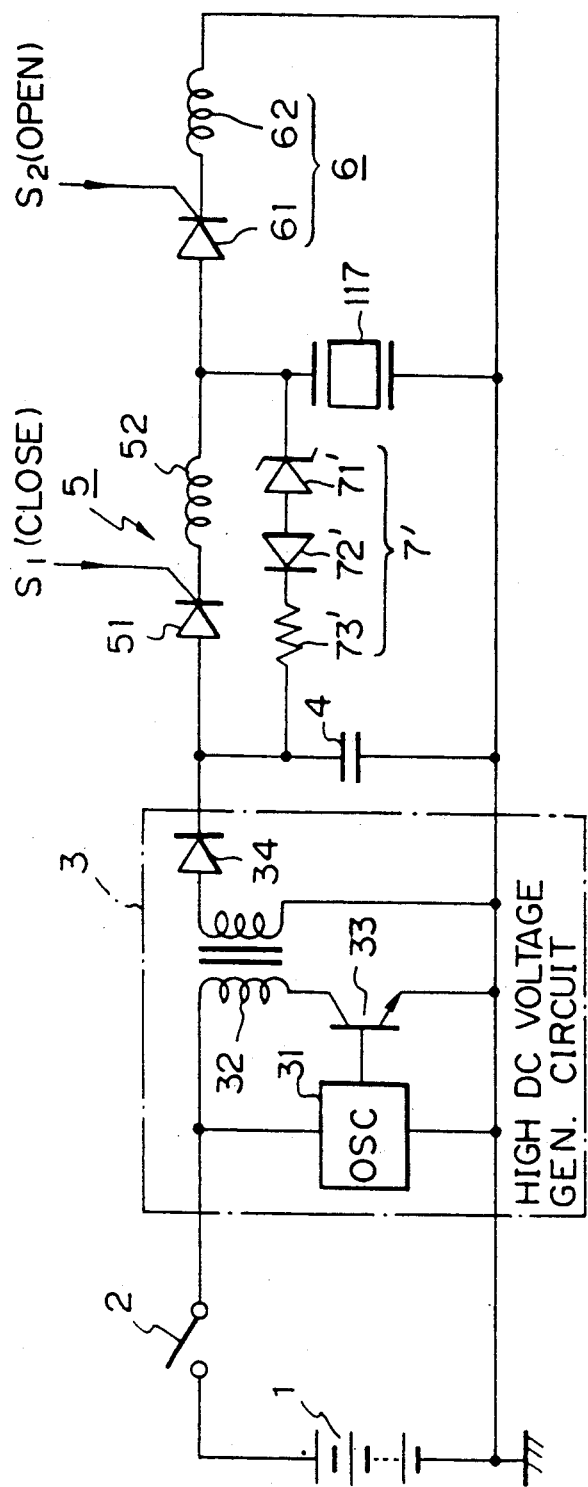
FIG. 10 is a circuit diagram showing a modification of FIG. 7.

FIG. 10 shows a modification of FIG. 3, in which the voltage gradually-decreasing circuit 7 is modified. That is, in FIG. 10, a voltage gradually-decreasing circuit 7′ is connected between a positive-potential-side terminal of the condenser 4 and a positive-potential side terminal of the piezoelectric element 117, and thus the discharging energy of the terminal voltage $V_{PZT}$ of the piezoelectric element 117 from +600 V to +500 V is regenerated at the condenser 4 as a DC high power supply source. This is advantageous from the point of a consumption of power, compared with the circuit of FIG. 7.

Figure 11:
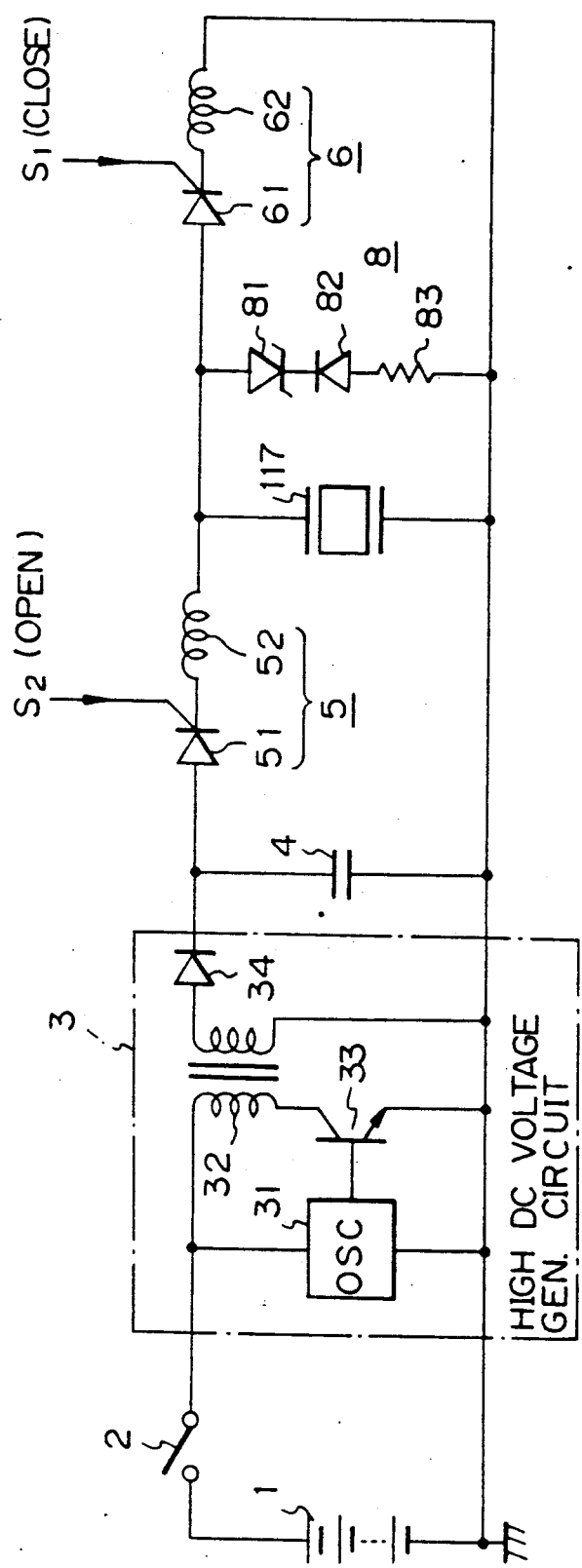
FIG. 11 is a circuit diagram illustrating a second embodiment of the apparatus for driving a piezoelectric element according to the present invention; and, FIGS. 12A through 12D are timing diagrams showing the operation of the circuit of FIG. 11.

In FIG. 11, which illustrates a second embodiment of the driving apparatus of a piezoelectric element according to the present invention, it is assumed that, when the piezoelectric element 117 is discharged, the element 117 is expanded to carry out a valve closing operation, as in Japanese Utility Model Publication No. 63-24362. Namely, instead of the voltage gradually-decreasing circuit 7 of FIG. 7, there is provided a voltage gradually-increasing circuit 8 which includes a Zener diode 81, a reverse current avoiding diode 82, and a resistor 83 for delaying a current flowing through the Zener diode 81, and the closing pulse S, is applied to the thyristor 61, and the opening pulse $S_2$ is applied to the thyristor 51.

In FIG. 11, when the thyristor 51 of the changing circuit 5 is turned ON, an LC oscillation circuit is formed by the condenser 4, the piezoelectric element 117, and the coil 52, thereby increasing the voltage $V_{PZT}$ of the piezoelectric element 117 at +500 V, and when the thyristor 61 is turned ON, an LC oscillation circuit is formed by the piezoelectric element 117 and the coil 62, to reduce the voltage $V_{PZT}$ of the piezoelectric element 117 at −300 V. Further, the Zener voltage of the Zener diode 81 of the voltage charging circuit 8 is 200 V.

The operation of the circuit of FIG. 11 will be explained with reference to FIGS. 12A through 12D.

Where the terminal voltage $V_{PZT}$ of the piezoelectric element 117 is 500 V, when the CPU generates a closing ignition signal $S_1$, the thyristor 61 is turned ON, an LC oscillation circuit is formed by the piezoelectric element 117 and the coil 62, and thus charges accumulated in the piezoelectric element 117 are discharged. In this case, as shown in FIG. 12C, due to the presence of the above-mentioned LC oscillation circuit, the terminal voltage $V_{PZT}$ of the piezoelectric element 117 becomes lower than 0 V, for example, becomes −300 V, and thereafter, the thyristor 61 is turned ON by natural commutation. When the terminal voltage $V_{PZT}$ of the piezoelectric element 5 is −300 V so that fuel is completely leaked, the state of the fuel injection apparatus of FIG. 1 is illustrated in FIG. 9A, and the volume $V_0$ of the pressure chamber 113 is smaller than the volume $V_1$ of FIG. 2A. That is, if there is no leakage of fuel, during an opening time, the volume $V_1$ of the pressure chamber 113 in a closing state of FIG. 9B is about the same as the volume $V_2$ of the pressure chamber 113 in an opening state of FIG. 9C, i.e., $$V_1 \approx V_2$$

Therefore, at a closing initial stage, the volume of the pressure chamber 113 is about the same as the volume $V_1$ at an end timing of a closing stage, but the volume V is going will become equal to $V_1$ (FIG. 9A), thus creating a large closing force at the needle 103. That is difference the between applied voltage −300 V at an end timing of a closing state and the applied voltage −200 V at an initial state of a closing state generates a large closing force at the needle 103.

As explained above, negative charges accumulated in the piezoelectric element 117 are gradually discharged by the voltage gradually-increasing circuit 8. Namely, the terminal voltage $V_{PZT}$ of the piezoelectric element 117 is gradually increased from −300 V to −200 V depending upon a time constant determined by the circuit 8 and the piezoelectric element 117, and thereafter, this voltage becomes stable. Therefore, when the terminal voltage $V_{PZT}$ is −200 V, $P_1 = P_2$. Also, since the volume V of the pressure chamber 113 is almost $V_1$, a next application of −300 V can again generate a large closing force.

When the terminal voltage $V_{PZT}$ of the piezoelectric element 117 becomes −200 V, the injection apparatus of FIG. 1 becomes in a state as shown in FIG. 9B, i.e., $P_1 = P_2$, but the closing force at the needle 103 is maintained as explained above, In the above-mentioned state, after a predetermined time has passed, the CPU generates an opening signal $S_2$, the thyristor 51 is turned ON, and thus an LC oscillation circuit is formed by the condenser 4, the coil 52, and the piezoelectric element 117, charge the piezoelectric element. In this case, due to the presence of the above-mentioned LC oscillation circuit, the terminal voltage $V_{PZT}$ of the piezoelectric element 117 becomes higher than 300 V, as shown in FIG. 12D, and becomes, for example, 500 V, and thereafter, the thyristor 51 is turned ON by natural commutation.

As a result, the injection valve becomes in a state as shown in FIG. 9C (which is the same as FIG. 2B).

Therefore, in the same way as in the first embodiment, the displacement of the piezoelectric element 117 is L at a final stage of a closing state (compared with an opening state), and at an initial stage of a closing state, this displacement will become L+ΔL, which increases the closing force at the needle 103. Note that only the voltage gradually-increasing circuit 8 is added, and the signals $S_1$ and $S_2$ for controlling the circuit of FIG. 11 are generated in the same manner as in the prior art driving apparatus not provided with the circuit 8.

As explained above, according to the present invention, the closing force at the needle (valve member) can be increased at an initial stage of a closing state, thereby avoiding the ascent of the valve member due to pressure wave by a water pulsive operation or the like, and avoiding a secondary injection when the present invention is applied to a fuel injection apparatus.

I claim:

1. An apparatus for driving a piezoelectric element to expand and contract a volume of a pressure chamber which is linked via a clearance of a valve member to a controlled liquid passage, to thereby close and open said valve member, comprising:

means for generating a high DC voltage;

means, including a first switch, coupled to said high Dc voltage generating means and said piezoelectric element for charging said piezoelectric element and for applying a first predetermined voltage across said piezoelectric element, thereby closing said valve member in response to operation of said first switch;

means coupled to said piezoelectric element for gradually decreasing the voltage across said piezoelectric element from said first predetermined voltage to a second predetermined voltage lower than said first predetermined voltage, said valve member remaining closed when said second predetermined voltage appears across said piezoelectric element; and means, including a second switch, coupled to said piezoelectric element for discharging charges accumulated in said piezoelectric element and decreasing the voltage across said piezoelectric element from said second predetermined voltage to a third predetermined voltage lower than said second predetermined voltage, thereby opening said valve member in response to operation of said second switch.

2. The apparatus of claim 1, wherein a voltage decreasing operation of said voltage gradually decreasing means is carried out within an initial stage of a closing state of said valve member and is complete before an opening state thereof.

3. The apparatus of claim 1 wherein said voltage gradually decreasing means comprises:

means for maintaining a constant voltage being turned on when the voltage of said piezoelectric element is higher than said second predetermined voltage; and means coupled to said constant voltage means for delaying a current flowing through said constant voltage means.

4. The apparatus of claim 1 wherein said voltage gradually decreasing means is coupled to said high DC voltage generating means, thereby regenerating charges accumulated in said piezoelectric element in said high DC voltage generating means.

5. The apparatus of claim 3, wherein said constant voltage means comprises a Zener diode.

6. The apparatus of claim 3, wherein said delay means comprises a resistor.

7. The apparatus of claim 1, wherein said high DC voltage generating means comprises:

a battery;

a DC/DC converter coupled to said battery, said converter generating a DC output; and a condenser, coupled to said DC/DC converter, said condenser accumulating the DC output of said DC/DC converter.

8. The apparatus of claim 7, wherein said charging means comprises:

a charging thyristor forming said first switch and a coil coupled in series between said condenser and said piezoelectric element;

an LC oscillation circuit comprising said condenser, said coil, and said piezoelectric element, said oscillation circuit charging said piezoelectric element to said first predetermined voltage when said charging thyristor is turned on by a closing signal.

9. The apparatus of claim 1 wherein said discharging means comprises:

a discharging thyristor forming said second switch coupled in series with a coil, said thyristor and said coil coupled in parallel with said piezoelectric element, an LC oscillation circuit comprising said coil and said piezoelectric element, said oscillation circuit discharging the charges accumulated in said piezoelectric element when said discharging thyristor is turned on by an opening signal.

10. An apparatus for driving a piezoelectric element to expand and contract a volume of a pressure chamber which is linked via a clearance of a valve member to a controlled liquid passage to thereby close and open said valve member comprising:

means for generating a high DC voltage;

means, including a first switch, coupled to said high DC voltage generating means and said piezoelectric element for charging said piezoelectric element and for applying a high voltage across said piezoelectric element, thereby opening said valve member in response to operation of said first switch;

means, including a second switch, coupled to said piezoelectric element for discharging charges accumulated in said piezoelectric element and applying a first predetermined voltage across said piezoelectric element, thereby closing said valve member in response to operation of said second switch; and means coupled to said piezoelectric element for gradually increasing the voltage across said piezoelectric element from said first predetermined voltage to a second predetermined voltage higher than said first predetermined voltage, said valve member remaining closed when said second predetermined voltage appears across said piezoelectric element.

11. The apparatus of claim 10, wherein a voltage increasing operation of said voltage gradually increasing means is carried out within an initial stage of a closing state of said valve member and is complete before an opening state thereof.

12. The apparatus of claim 10, wherein said voltage gradually increasing means comprises:

means for maintaining a constant voltage, said means being turned on when the voltage across said piezoelectric element is lower than said second predetermined voltage; and means coupled to said constant voltage means for delaying a current flowing through said constant voltage means.

13. The apparatus of claim 12, wherein said constant voltage means comprises a Zener diode.

14. The apparatus of claim 12, wherein said delay means comprises a resistor.

15. The apparatus of claim 12, wherein said DC voltage generating means comprises:

a battery;

a DC/DC converter coupled to said battery, said converter generating a DC output; and a condenser, coupled to said DC/DC converter, said condenser accumulating the DC output of said DC/DC converter.

16. The apparatus of claim 15, wherein said charging means comprises:
 a charging thyristor forming said first switch and a coil coupled in series between said condenser and said piezoelectric element;
 an LC oscillation circuit comprising said condenser, said coil, and said piezoelectric element, said oscillation circuit charging said piezoelectric element when said charging thyristor is turned on by an opening signal.

17. The apparatus of claim 10 wherein said discharging means comprises:
 a discharging thyristor forming said second switch coupled in series with a coil, said thyristor and said coil being coupled in parallel with said piezoelectric element;
 an LC oscillation circuit comprising said coil and said piezoelectric element, said oscillation circuit discharging the charges accumulated in said piezoelectric element, thereby applying said first predetermined voltage across said piezoelectric element when said discharging thyristor is turned on by a closing signal.

* * * * *

UNITED STATES PATENT AND TRADEMARK OFFICE
CERTIFICATE OF CORRECTION

PATENT NO. : 5,053,668
DATED : October 1, 1991
INVENTOR(S) : Masaki Mitsuyasu

It is certified that error appears in the above-indentified patent and that said Letters Patent is hereby corrected as shown below:

| Column | Line | |
|---|---|---|
| 2 | 14 | After "driving" change "an" to --a--. |
| 2 | 60 | Before "upper" change "a" to --an--. |
| 2 | 65 | Change "extensive" to --expansive--. |
| 3 | 41 | Before "opening" change "a" to --an--. |
| 3 | 53 | Before "lower" change "an" to --a--. |
| 4 | 3 | Change "expansional contraction" to --expansion/contraction--. |
| 4 | 46 | Change "$P_1 > P_2$" to --$P_1 < P_2$--. |
| 6 | 18 | After "element" insert --117--. |
| 6 | 35 | Change "9(A)" to --9(B)--. |
| 6 | 48 | Before "A secondary" delete bracket. |
| 6 | 51 | After "103." delete bracket. |

UNITED STATES PATENT AND TRADEMARK OFFICE
CERTIFICATE OF CORRECTION

PATENT NO. : 5,053,668
DATED : October 1, 1991
INVENTOR(S) : Masaki Mitsuyasu

It is certified that error appears in the above-indentified patent and that said Letters Patent is hereby corrected as shown below:

| Column | Line | |
|---|---|---|
| 8 | 39 | Before "closing" change "an" to --a--. |
| 8 | 43 | Before "closing" change "an" to --a--. |
| 10 | 7 | After "fuel" delete the comma. |
| 10 | 18 | Before "will" delete "is going". |
| 10 | 32 | Change "$P_1 = P_2$" to --$P_1 \cong P_2$--. |
| 10 | 45 | Change "charge" to --charging--. |

Signed and Sealed this

Twenty-sixth Day of July, 1994

Attest:

BRUCE LEHMAN

Attesting Officer        Commissioner of Patents and Trademarks